Patented June 12, 1951

2,556,430

UNITED STATES PATENT OFFICE 2,556,430

METHOD AND APPARATUS FOR PREPARING MIXED SULFUR-HYDROCARBON VAPORS

Milton M. Marisic, Northfield, and Charles A. Porter, Chicago, Ill., assignors to The Pure Oil Company, Chicago, Ill., a corporation of Ohio Application April 21, 1945, Serial No. 589,680

14 Claims. (Cl. 23—224)

This invention relates to a method and apparatus for preparing a mixture of sulfur vapors and gaseous or vaporous hydrocarbons.

In various known processes it is necessary to react sulfur at high temperatures with hydrocarbons. As examples of such processes may be mentioned reaction of sulfur vapors with methane or other hydrocarbons to form carbon disulfide, dehydrogenation of hydrocarbons such as normal butane in the presence of sulfur to form butylenes and butadiene, and reaction of sulfur vapors with unsaturated hydrocarbons to form sulfur compounds containing two or more carbon atoms per molecule.

The vaporization of sulfur and superheating of sulfur vapors presents a difficult problem because of the corrosive effect of sulfur on common metals and alloys at high temperatures.

An object of this invention is to provide method and apparatus for vaporizing and superheating sulfur vapors.

Another object of this invention is to provide method and apparatus for preparing a mixture of vaporized sulfur and gaseous or vaporous hydrocarbons for subsequent reaction with each other.

A still further object of the invention is to provide method and apparatus for vaporizing and superheating sulfur vapors in a manner to eliminate corrosion difficulties encountered when vaporization and superheating is conducted in a metallic heating apparatus.

Other objects of the invention will become apparent from the description and the accompanying drawings of which:

Figure 1:
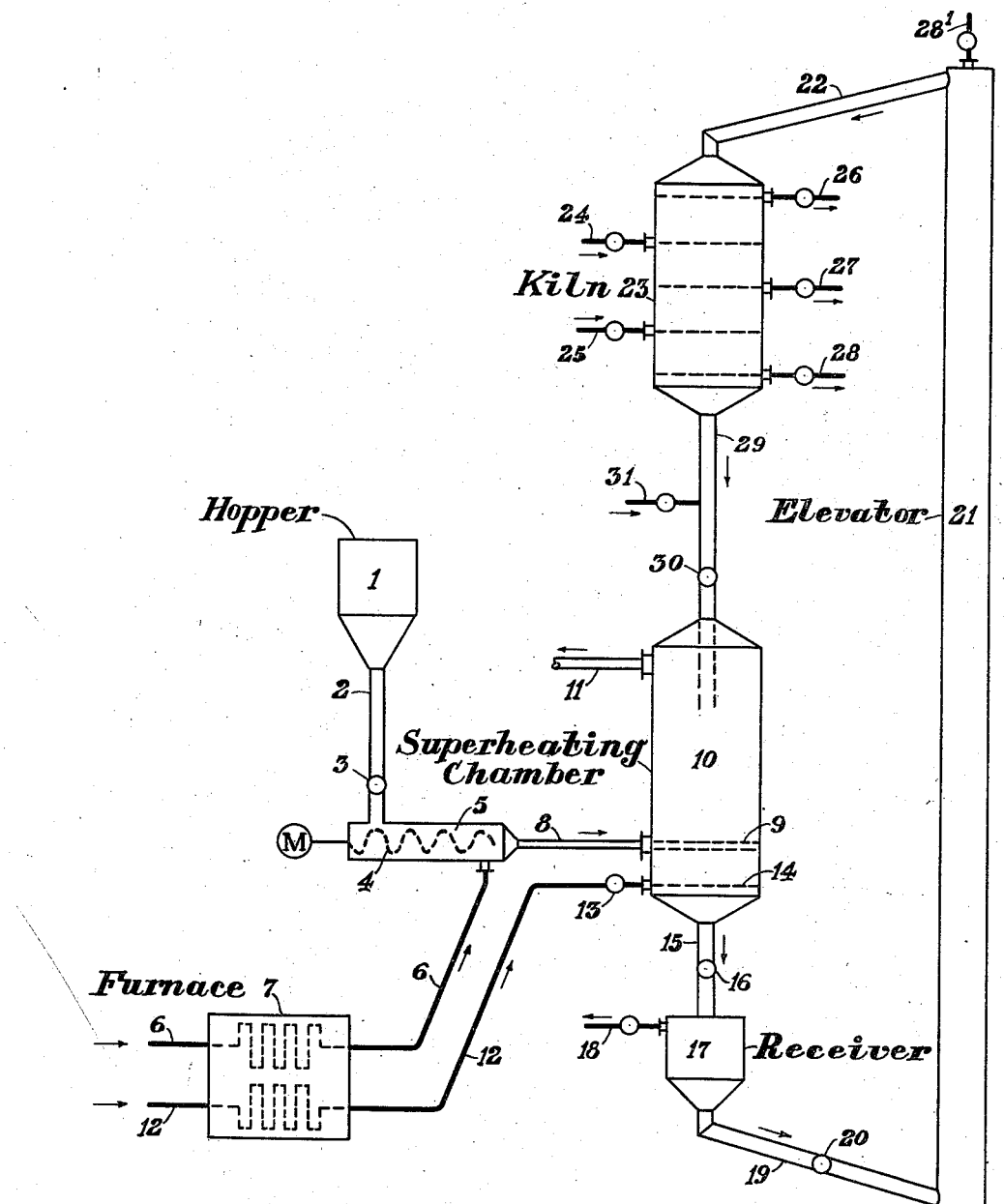
Figure 1 is a diagrammatic, elevational view of a form of apparatus for carrying out our invention.

Referring to Figure 1, numeral 1 indicates a hopper from which finely divided sulfur is fed through line 2 and valve 3 to screw conveyor 4 located in chamber 5. Hydrocarbon gas such as methane or other gas which it is desired to react with sulfur, is charged through line 6 and is preheated in furnace 7 to a temperature approximating the melting point of sulfur and then injected into chamber 5 at the end of the screw conveyor 4 in order to aerate the sulfur and force it through line 8 to a suitable distributor 9 into vaporizing and superheating chamber 10. The temperature to which the methane or hydrocarbon gas is heated and the quantity of sulfur and methane are such that the temperature of the sulfur-gas mixture forced into chamber 10 is approximately 230° F., and in no event as high as the melting point of sulfur. In chamber 10 the aerated sulfur contacts a downwardly moving bed of hot refractory material in granular, fragmentary or pelleted form. The refractory material may be Carborundum, Alundum, quartz, fire brick or any other refractory material which is substantially inert to sulfur at the high temperatures attained in chamber 10. Upon contact with the hot refractory material the sulfur is rapidly melted and vaporized and the sulfur vapors pass upwardly in counter-current contact with the downwardly moving bed of refractory material. Any impurities, such as organic matter or mineral substances, contained in the sulfur are deposited on the refractory material and thus removed from the sulfur vapors. During its passage through chamber 10, the sulfur-gas mixture is superheated to the desired temperature. The superheated sulfur vapors and hydrocarbon leave the chamber 10 through line 11 and may be charged to a suitable reactor lined with refractory material resistant to corrosion for reacting the sulfur and hydrocarbon. For example, the vapors leaving line 11 may be charged directly to a refractory-lined reactor filled with granular or pelleted silica gel, activated alumina or natural or synthetic alumina-silica catalyst heated to a temperature of approximately 1150 to 1200° F. in order to convert the mixture of sulfur vapor and methane or other hydrocarbon to carbon disulfide.

Sufficient methane or other hydrocarbon gas preferably similar to that introduced through line 6 is introduced through line 12 and heated in furnace 7 to a temperature of approximately 900–950° F. after which it is forced through valve 13 and distributor 14 into the bottom of chamber 10 to purge any remaining sulfur from the refractory material prior to its leaving chamber 10. The gas introduced through distributor 14 also serves as a sealing medium to prevent sulfur vapor from escaping from the bottom of reactor 10. Granular material at a temperature of approximately 900° F. may be withdrawn continuously or intermittently from the bottom of chamber 10 through line 15 controlled by valve 16 into hopper or receiver 17. A portion of the gas introduced through distributor 14 will pass into receiver 17 with the refractory material. This gas is removed from receiver 17 through valve-controlled line 18. The gas withdrawn through line 18 may be recycled to line 12 and fed back into the bottom of the reactor.

The refractory material may be continuously or intermittently withdrawn from receiver 17 through line 19 controlled by valve 20 and fed by elevator 21 through line 22 to the top of kiln 23. The refractory material moves downwardly through kiln 23 as a bed and is heated therein by a mixture of combustible gas, liquid, or powdered fuel, and air is introduced through valve-controlled lines 24 and 25. As combustible material, any type of natural gas, artificial gas, such as producer gas, or furnace oils, acid sludges, tars, etc. may be used. The products of combustion are withdrawn from the kiln through valve-controlled lines 26, 27 and 28. A portion or all of the combustion gases may be circulated through the elevator 21 to preheat the refractory material prior to its entrance into the kiln 23. The valve-controlled line 28' is provided at the top of the elevator for withdrawing combustion gases circulated through the elevator 21 or which escape from the kiln through line 22.

A portion of the heat in the kiln may be supplied by burning organic matter deposited on the refractory material during the vaporization of the sulfur. Sulfur generally contains both organic and inorganic impurities which deposit on the refractory material during vaporization.

Sufficient heat is supplied to the kiln 23 to heat the refractory material to a temperature somewhat above the temperature to which it is desired to heat the sulfur vapors. For example, if it is desired to heat the sulfur vapors to 1200° F., the refractory material may be heated to approximately 1400° F.

Hot refractory material leaves the bottom of the kiln 23 through line 29 and passes through valve 30 into the upper portion of the heating and vaporizing chamber 10. Valve-controlled line 31 is provided in the line 29 above valve 30 for purging flue gases from the refractory material and for sealing chamber 10 against leakage. For this purpose a gas preferably corresponding to that charged to the chamber 10 through line 6 is used and this gas is superheated to at least a temperature which approximates that of the refractory material leaving the bottom of the kiln. The gas is injected into line 29 at a pressure slightly above that existing in chamber 10. For example, if the pressure in chamber 10 were 50 pounds per square inch, the pressure of the methane or other gas charged through line 31 would be approximately 52-55 pounds per square inch. A portion of the gas charged to line 31 passes into the kiln 23 where it will be burned and thus will supply a portion of the heat required for heating the refractory material. Another portion of the gas charged through line 31 will pass with the refractory material into chamber 10 and become mixed with the sulfur vapors leaving the chamber 10 through line 11. Care should be exercised that the total amount of hydrocarbon charged to chamber 10 through lines 6, 12 and 31 does not exceed the amount which it is desired to mix with the sulfur for the subsequent reaction.

The temperature of the refractory material leaving the bottom of chamber 10 should be above the temperature at which sulfur vaporizes and preferably at a temperature around 900-950° F. The temperature of the refractory material leaving the bottom of the chamber 10 can be controlled by regulation of the temperature of the refractory material entering chamber 10, regulation of the speed at which refractory material passes through chamber 10, and regulation of the rate at which sulfur and gas is charged to chamber 10.

Where the presence of steam in the reaction mixture is not objectionable, superheated steam at a temperature of approximately 900° F. may be charged through line 12 and used for purging instead of hydrocarbon gas.

The apparatus shown in Figure 1 is intended preferably for intermittent operations. Hot refractory material is intermittently charged to and withdrawn from chamber 10 by operation of valves 30 and 16. Likewise, refractory material is intermittently withdrawn from receiver 17 after exhausting gas therefrom by operation of valve 20.

Figure 2:
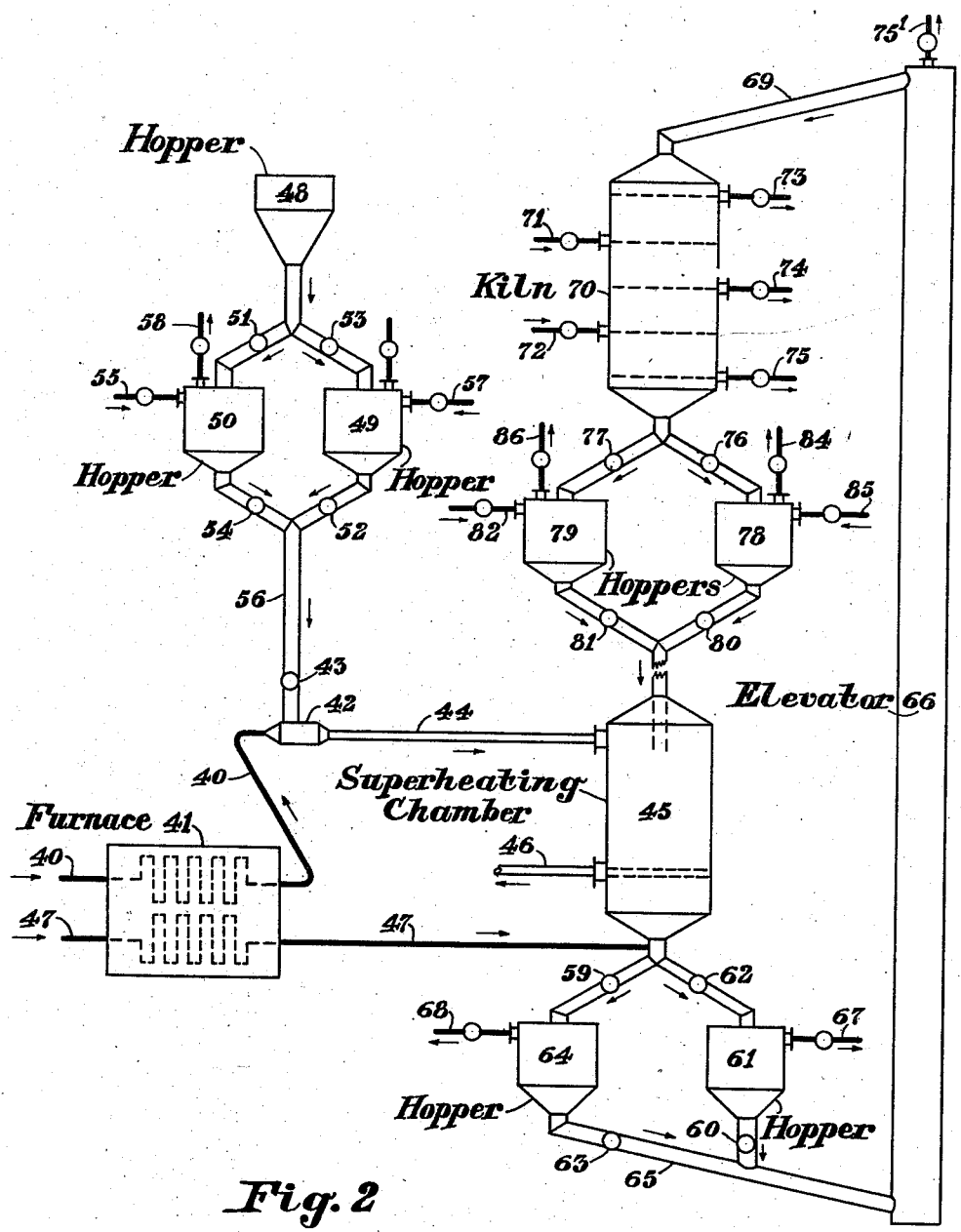
Figure 2 is a diagrammatic, elevational view of another form of apparatus for carrying out our invention.

Referring now to Figure 2, methane or other hydrocarbon gas or vapor enters through line 40, passes through furnace 41 where it is preheated to a temperature such that when mixed with sulfur the temperature of the mixture will be below the melting point of sulfur, then charged to aerating chamber 42 to which sulfur is fed through valve 43. The powdered sulfur becomes mixed with the gas from line 40 and the aerated mixture passes through line 44 to the top of vaporizing and superheating chamber 45. In chamber 45 the gas-sulfur mixture contacts a downwardly moving bed of hot refractory material whereupon the sulfur is immediately melted and vaporized and passes concurrently with the refractory material through the chamber 45. As it passes through the chamber, the sulfur is superheated to the desired temperature before it leaves the bottom portion thereof through line 46. Methane or other hydrocarbon gas or, when it is not objectionable, steam heated to approximately 900-950° F. in furnace 41 is charged through line 47 into the bottom of chamber 45 in order to purge the refractory material of any remaining sulfur. The gas charged through line 47 also acts as a seal to prevent sulfur vapors from passing out of the bottom of chamber 45. Chamber 45 is designed to function continuously at slightly above atmospheric pressure or at higher super-atmospheric pressure.

Powdered sulfur from hopper 48 passes either to hopper 49 or 50 at atmospheric pressure. While sulfur is being fed to one hopper, the other hopper is feeding sulfur to the aerating chamber 42. This is accomplished by closing valve 51 in the inlet to hopper 50 and the valve 52 in the outlet of hopper 49 and opening valve 53 in the inlet to hopper 49 and valve 54 in the outlet to hopper 50. Sulfur is then charged from hopper 48 through valve 53 under atmospheric pressure to hopper 49. At the same time powdered sulfur is caused to flow from hopper 50 to aerating chamber 42 by pressuring hopper 50 through valve-controlled line 55 with methane or other gas similar to that charged through line 40. Sulfur is forced from hopper 50 through valve 54, line 56 and valve 43 to the aerating chamber 42 until hopper 50 is empty, at which time valve 54 is closed. During the time when sulfur is fed from hopper 50, hopper 49 is filled with sulfur, valve 53 is closed and the hopper is pressured by means of gas forced into the top of the hopper through valve-controlled line 57. The hopper is then ready to feed sulfur to the aerating chamber 42 as soon as hopper 50 is empty, by opening valve 52.

After valve 54 is closed, hopper 50 is depressured through valve-controlled line 58 after which valve 51 is opened and hopper 50 is recharged with sulfur. The alternate filling and emptying of hoppers 49 and 50 is repeated in order to provide for continuous flow of sulfur to the aerating chamber 42. The gas removed from hoppers 49 and 50 during the depressuring step may be charged to line 40 for injection into the chamber 45.

In order to provide for continuous withdrawal of refractory material from chamber 45, a dual hopper arrangement is connected to the outlet of the chamber. While valve 59 in the outlet of the chamber 45 and valve 60 in the outlet of hopper 61 are closed, valve 62 in the inlet to hopper 61 and valve 63 in the outlet of hopper 64 are open. Refractory material passes from hopper 64 through line 65 to the bottom of elevator 66. During this time hopper 61 is filled with refractory material from chamber 45 after which valve 62 is closed and any gas which has passed into the hopper 61 with the refractory material is removed through valve-controlled line 67. This gas may be recycled to either line 46 or 47. When hopper 64 is empty, valve 63 is closed and valve 59 is opened. Valve 60 is opened to permit refractory material to be discharged from hopper 61 to elevator 66. Any gas accumulated in hopper 64 is eliminated through valve-controlled line 68 and this gas may be recycled to either line 40 or 47. Thereafter, valve 59 is open to permit hopper 64 to be again charged with refractory material as soon as hopper 61 is full. This alternate filling and emptying of hoppers 61 and 64 is continued in order to make withdrawal of refractory material from chamber 45 continuous.

The refractory material discharged from hopper 61 and 64 is picked up by elevator 66 and charged through line 69 to the top of kiln 70. The elevator 66 may be of the bucket or any other suitable type for transferring comminuted solid material. The refractory material moves downwardly through the kiln 70 as a continuous bed and is heated therein by means of a mixture with air and combustible material, either gas, liquid or powdered fuel, introduced through valve-controlled lines 71 and 72. The combustion or flue gases are withdrawn from the kiln through valve-controlled lines 73, 74 and 75 and may, if desired, be circulated in whole or part through elevator 66 in order to preheat the refractory material. Any gases passing upward through the elevator or through line 69 are removed from the top of the elevator through valve-controlled line 75'.

A dual system of hoppers is provided for discharging refractory material from kiln 70 and recharging refractory material to chamber 45. Valves 76 and 77 are provided in the inlets to hoppers 78 and 79 respectively, and valves 80 and 81 are provided in the outlets of hoppers 78 and 79 respectively. Valves 76 and 81 will be closed while valves 77 and 80 are open in order to permit refractory material to be fed from the kiln to hopper 79 and refractory material to be fed from hopper 78 to chamber 45. When hopper 79 is filled, valve 77 is closed and the hopper 79 is pressured to a pressure equal to or slightly above that existing in chamber 45 by charging through valve-controlled line 82, gas similar to that charged through line 40. As soon as hopper 78 is empty, valve 80 is closed and valve 81 is opened to permit refractory material to be charged from hopper 79 to the chamber 45. As soon as valve 80 is closed, hopper 78 is depressured through valve-controlled line 84. Gas taken off through line 84 may be recycled to chamber 45 through line 40 or may be burned in kiln 70. Valve 76 is then opened and hot refractory material allowed to flow into hopper 78 until filled, at which time valve 76 is closed and the hopper 78 pressured by admitting through valve-controlled line 85 gas similar to that charged through line 40. This hopper is then ready to feed refractory material to chamber 45 when hopper 79 is empty. When hopper 79 is empty, valve 81 is closed, the hopper is depressured through valve-controlled line 86 and is again ready to be refilled. Gas withdrawn through line 86 may be recycled to either line 40 or to kiln 70. The cycle is repeated in order to continuously feed hot refractory material from kiln 70 to chamber 45.

It will be apparent that the aerated sulfur in Figure 2 may be fed to the lower portion of reactor 45 and the superheated sulfur vapors and hydrocarbons withdrawn from the top thereof, as in Figure 1. Likewise, it is apparent that the aerated sulfur in Figure 1 may be charged to the upper portion of chamber 10 and the superheated sulfur vapors and hydrocarbons withdrawn from the lower portion of the chamber 10, as shown in Figure 2.

Figure 3:
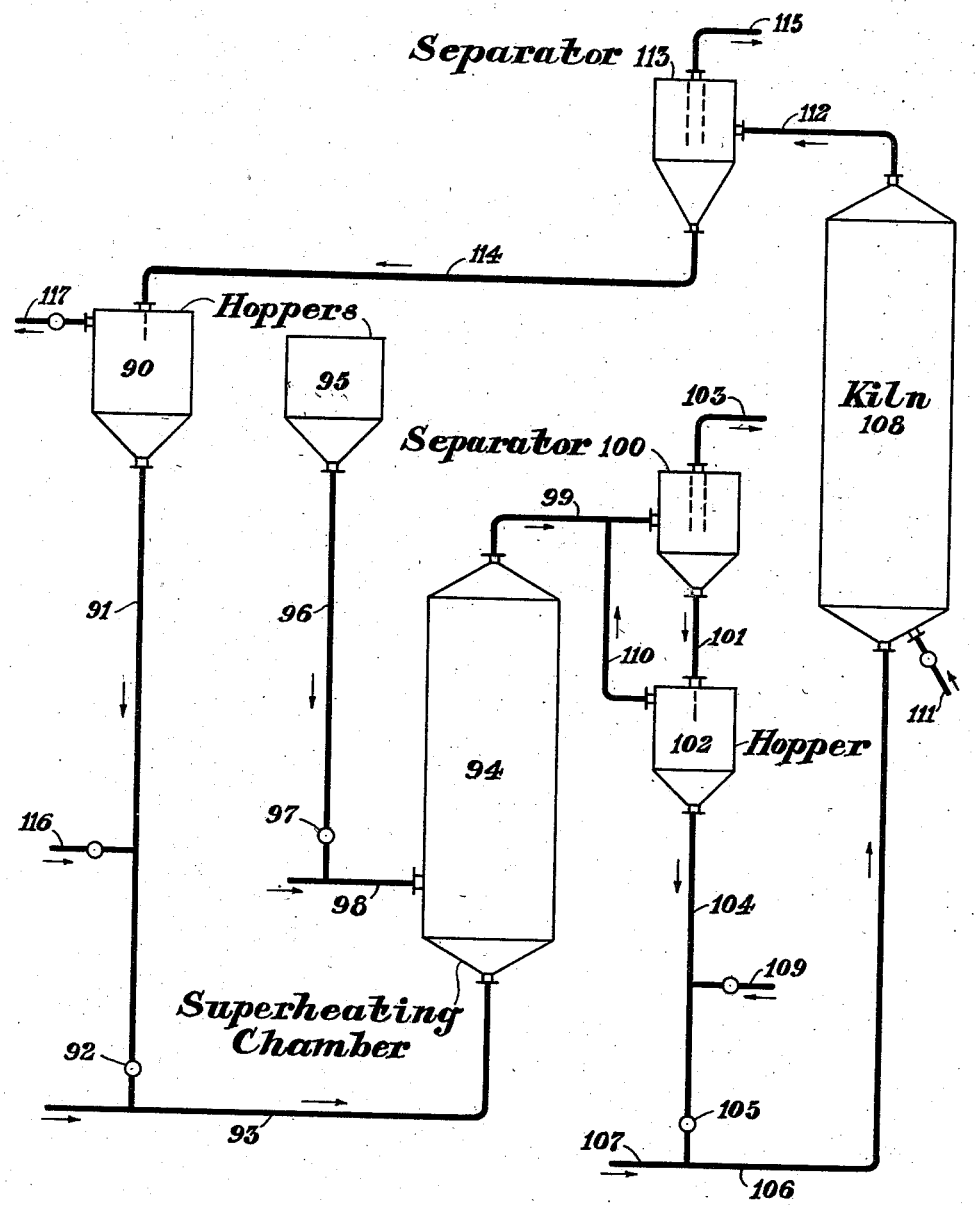
Figure 3 is a diagrammatic, elevational view of still another form of apparatus for carrying out our invention.

Referring now to Figure 3, powdered refractory material of about 100 mesh size or smaller, heated to the desired temperature, flows from hopper 90 downwardly through vertical leg 91 and valve 92 and meets a stream of preheated methane or other hydrocarbon gas or vapor in line 93. The methane or other gas or vapor may be preheated to any desired temperature, but preferably to a temperature approximating the temperature of refractory material. The methane stream takes up the powdered refractory material in suspension and charges it into the bottom of the vaporizing and superheating chamber 94. Finely divided or powdered sulfur is charged from hopper 95 downwardly through vertical leg 96 controlled by valve 97 and meets a stream of methane or other hydrocarbon gas charged through line 98. The hydrocarbon charged through line 98 is preferably preheated to a temperature which is insufficient to melt the sulfur. The sulfur-hydrocarbon mixture is discharged into the lower portion of chamber 94 where it meets the stream of hot refractory material and hydrocarbon. The sulfur is immediately melted and vaporized and passes upwardly through the chamber in concurrent relationship with the hot refractory material and is superheated to the desired temperature. The sulfur vapor-hydrocarbon mixture and refractory material leave chamber 94 through line 99 and pass into cyclone separator 100 where the refractory material is separated from the sulfur vapors and hydrocarbons. Refractory material is withdrawn from separator 100 through line 101 and flows into hopper 102. The superheated sulfur vapors and hydrocarbon gas leave the top of the cyclone separator through line 103.

The powdered refractory material is withdrawn from hopper 102 through vertical leg 104 controlled by valve 105 and passes to line 106 where it meets a stream of methane or other combustible gas charged to the line 106 at 107 and is carried in suspension into the bottom of kiln 108. The carrier gas is preferably preheated prior to charging it at 107. Gas similar to that introduced into the line 93 is introduced into leg 104 through valve-controlled line 109 to purge the refractory material leaving hopper 102 free of sulfur. The gas introduced through line 109 is heated to a temperature above the vaporizing temperature of sulfur, preferably about 900-950° F. The resulting sulfur vapors and gas escape from hopper 102 through line 110 and are returned through line 99 to separator 100.

Preheated air is admitted into the bottom of kiln 108 through valve-controlled line 111 in order to burn the gas admitted through 107. The refractory material carried in suspension in the gases undergoing combustion is heated to the desired temperature for vaporizing sulfur and superheating the vapors. A portion of the heat for heating the refractory material may be supplied by organic material deposited thereon during the vaporization of the sulfur. The hot refractory material and combustion flue gases leave the top of kiln 108 through line 112, pass into cyclone separator 113 where the refractory material is separated from the combustion gases. The refractory material passes through line 114 to hopper 90 and the combustion gases leave cyclone separator 113 through line 115. Methane or other gases which may be similar to that charged to line 93 is charged into line 91 through valve-controlled line 116 in order to purge the refractory material in hopper 90 free of flue gas. The mixture of purging gas and flue gas is removed from hopper 90 through valve-controlled line 117 and may be recycled to 107 or directly to kiln 108.

It will be understood that the apparatus shown and described in Figures 1, 2 and 3 will be made of or will be lined with refractory material, particularly those parts thereof which come in contact with sulfur vapors, thereby providing corrosion resistant equipment. This is made possible by virtue of the fact that vaporization and heating of the sulfur is accomplished by the hot refractory material which is cycled through the system. The refractory material used to make or line the apparatus which comes in contact with sulfur vapor may be of substantially the same type as the refractory material used for heating purposes.

As an example illustrating our process, a mixture of sulfur vapors and methane is prepared in which the mole ratio of sulfur and methane is approximately 1:1 for subsequent reaction in the presence of silica gel to form carbon disulfide. Granular Alundum, in the form of cylindrical pellets having a diameter of approximately $\frac{1}{16}$ of an inch and a length of approximately $\frac{1}{16}$ of an inch, is continuously circulated through the apparatus shown in Figure 1. In kiln 23 the Alundum pellets are heated by combustion of methane with air to a temperature of 1400° F. Methane is charged into the chamber 10 through line 6 and is preheated to a temperature of from 70 to 240° F. before contacting the sulfur. In chamber 10 the mixture of methane and sulfur is vaporized and superheated to a temperature of 1200° F. under a pressure of 50 pounds per square inch gauge. The mixture of superheated sulfur-methane is charged from line 11 to a catalytic reactor for making carbon disulfide. Methane is charged through line 6 at a rate of 61.5 cubic feet per hour measured at 70° F. Sulfur is charged at the rate of 23.5 pounds per hour and the Alundum pellets are passed through chamber 10 at the rate of 1 cubic foot per hour. The temperature of the Alundum pellets leaving the bottom of the chamber 10 is approximately 900° F. Methane is used as purging gas and is charged through line 12 to chamber 10 at a temperature of approximately 900-950° F. Methane gas charged as purging gas through line 31 is heated to a temperature of approximately 1400° F. prior to charging through line 29.

It will be seen, therefore, that we have provided a method for preparing a mixture of sulfur vapors and hydrocarbon gas or vapor at appropriate temperature for reaction in a manner which avoids corrosion of the vaporizing and heating equipment and which obviates the necessity of heating the reaction chamber so that a reaction chamber of refractory sulfur corrosion-resistant material can be used. It will also be seen that the mixture of sulfur vapor and hydrocarbon can be prepared at a pressure sufficient to enable it to flow through a reaction system connected to the outlet of the vaporizing and superheating chamber.

In the appended claims it is to be understood that "comminuted" when employed as descriptive of the particle size of the refractory sulfur resistant heat transfer material connotes either a granular type particle size material which may be spherical, pelleted, extruded, etc. or a pulverulent or microspherical-type particle size material. Application of the correct description will depend upon whether the particular embodiment described in the applicable claim is directed to a fluidized process employing pulverulent type heat transfer agent, one form of which is schematically set forth in Figure 3, or a granular-particle moving bed type operation which is exemplified in Figure 1 and Figure 2 and which utilizes a less finely divided material than is employed in the aforementioned fluidized process. Both types of operation form specific embodiments of the instant application.

We claim:

1. The method of vaporizing sulfur comprising alternately heating comminuted refractory material, resistant to sulfur vapor corrosion, to temperatures above the boiling point of sulfur and bringing into contact with said heated material a suspension of powdered sulfur in a non-oxidizing hydrocarbon gas.

2. The method of vaporizing sulfur comprising circulating a comminuted solid refractory material, resistant to sulfur corrosion at temperatures above the boiling point of sulfur, through a heating zone and a vaporizing zone, heating said material to a temperature above the boiling point of sulfur in said heating zone, charging the heated material to said vaporizing zone, charging a suspension of sulfur in hydrocarbon gas to said vaporizing zone in direct contact with said heated material, maintaining the sulfur in contact with said heated material for a period of time sufficient to vaporize the sulfur, withdrawing sulfur vapors and gas from the vaporizing zone and recycling said material from the vaporizing zone to said heating zone.

3. The method of preparing a mixture of sulfur vapor and hydrocarbon for use in a subsequent reaction comprising charging a suspension of sulfur in hydrocarbon gas to a vaporizing zone resistant to sulfur corrosion, contacting said suspension in said vaporizing zone with comminuted refractory material heated to a temperature above the boiling point of sulfur for a period of time sufficient to vaporize the sulfur, withdrawing the mixed sulfur vapors and hydrocarbon gas from the vaporizing chamber, withdrawing the refractory material from the vaporizing zone before the temperature thereof falls below the boiling point of sulfur, heating the withdrawn refractory material in a separate heating zone to a temperature above the boiling point of sulfur and returning it to said vaporizing zone.

4. Method in accordance with claim 3 in which the comminuted refractory material is heated by direct contact with hot combustion gas.

5. Method in accordance with claim 3 in which the comminuted refractory material is heated by direct contact with hot combustion gas, the heated material is purged of combustion gas prior to contact with the sulfur and the refractory material is purged of sulfur prior to heating it with combustion gas.

6. Method in accordance with claim 3 in which the comminuted refractory material moves as a solid bed through the heating zone and the vaporizing zone.

7. Method in accordance with claim 3 in which the comminuted refractory material passes continuously as a solid bed through said heating zone and said vaporizing zone.

8. Method in accordance with claim 5 in which said comminuted refractory material passes through said heating and vaporizing zone in gaseous suspension.

9. The method of preparing a mixture of sulfur vapors and hydrocarbons at a temperature suitable for reaction in a separate reaction zone comprising circulating comminuted refractory material resistant to attack by sulfur vapors through a separate heating zone and a separate vaporizing zone resistant to sulfur vapor corrosion, heating said refractory material in said heating zone to a temperature substantially in excess of the boiling point of sulfur by direct contact with hot combustion gas, separating combustion gas from hot refractory material and charging the hot refractory material to said vaporizing zone while preventing combustion gas from entering said vaporizing zone, charging a suspension of powdered sulfur in gaseous hydrocarbon to said vaporizing zone in direct contact with said hot refractory material, providing sufficient time of contact in said vaporizing zone to vaporize the sulfur, withdrawing vaporized sulfur and gaseous hydrocarbons from said vaporizing zone while preventing sulfur from entering said heater, withdrawing refractory material from said vaporizing zone before its temperature drops below the boiling point of sulfur, recycling the withdrawn refractory material to said heating zone and purging said refractory material of sulfur prior to recycling it to said heating zone.

10. Method in accordance with claim 9 in which the comminuted refractory material is charged to the vaporizing zone as a suspension in gaseous hydrocarbon preheated to approximately the temperature of the refractory material and the refractory material passes through the heating zone in the form of a gaseous suspension.

11. Method in accordance with claim 9 in which the comminuted refractory material is heated to a temperature of approximately 1400° F. in said heating zone and the sulfur-hydrocarbon mixture is heated to a temperature of approximately 1200° F. in said vaporizing zone.

12. The method of vaporizing sulfur comprising, circulating a comminuted solid refractory material through a heating zone and a vaporizing zone, said refractory material being resistant to sulfur corrosion at temperatures above the boiling point of sulfur, heating said refractory material to a temperature above the boiling point of sulfur in said heating zone, charging said heated material to said vaporizing zone, charging a suspension of sulfur in a hydrocarbon gas to said vaporizing zone in direct contact with said heated material for a period of time sufficient to vaporize the sulfur, withdrawing sulfur vapors and said hydrocarbon gas from the vaporizing zone, and recycling said refractory material from the vaporizing zone to said heating zone.

13. An apparatus for vaporizing sulfur comprising, a hopper for feeding solid comminuted sulfur to an aerating chamber, a heater for preheating a carrier gas, and conduit to conduct carrier gas from said heater to said aerating chamber wherein solid sulfur is mixed with said carrier gas, a vaporizer lined with refractory material resistant to high temperature sulfur vapor corrosion, a kiln for heating solid comminuted refractory material, means for circulating said solid comminuted refractory material from said kiln to said vaporizer and from said vaporizer back to said kiln, a conduit for carrying sulfur in said gaseous carrying medium from said aerating chamber to said vaporizer, means for withdrawing sulfur vapors from said vaporizer without permitting said vapors to pass through said kiln, and means for purging said comminuted refractory material of adherent or occluded sulfur as it passes from said vaporizer, and means for separating sulfur from said purging gas and means for returning said sulfur to the sulfur feed.

14. An apparatus in accordance with claim 13 including means for suspending said comminuted refractory material in a gaseous medium before circulating it through said heater and said vaporizer.

MILTON M. MARISIC.
CHARLES A. PORTER.

REFERENCES CITED

The following references are of record in the file of this patent:

UNITED STATES PATENTS

| Number | Name | Date |
|---|---|---|
| 1,148,331 | Olsson | July 27, 1915 |
| 1,178,667 | Niewerth | Apr. 11, 1916 |
| 1,409,338 | Fenton | Mar. 14, 1922 |
| 1,638,992 | Gillett | Aug. 16, 1927 |
| 2,056,732 | Mekler | Oct. 6, 1936 |
| 2,239,801 | Voorhees | Apr. 29, 1941 |
| 2,320,318 | Simpson et al. | May 25, 1943 |
| 2,331,433 | Simpson et al. | Oct. 12, 1943 |
| 2,362,296 | Murphree et al. | Nov. 7, 1944 |
| 2,392,289 | McCullough et al. | Jan. 1, 1946 |
| 2,446,388 | Ramseyer | Aug. 3, 1948 |